United States Patent [19]

Saito et al.

[11] Patent Number: 4,828,460

[45] Date of Patent: May 9, 1989

[54] ELECTROMAGNETIC PUMP TYPE AUTOMATIC MOLTEN-METAL SUPPLY APPARATUS

[75] Inventors: Hirozi Saito, Sagamihara; Shoko Kubota, Yokohama; Noriyuki Motomura, Zama, all of Japan

[73] Assignee: Toshiba Kikai Kabushiki Kaisha, Tokyo, Japan

[21] Appl. No.: 82,130

[22] Filed: Aug. 6, 1987

[30] Foreign Application Priority Data

Aug. 13, 1986 [JP] Japan ............................... 61-188685
Aug. 19, 1986 [JP] Japan ............................... 61-126419
Aug. 19, 1986 [JP] Japan ............................... 61-126420

[51] Int. Cl.[4] ...................... B22D 27/02; H02K 44/00

[52] U.S. Cl. ...................................... 417/50; 164/500; 164/147.1; 164/312; 164/156

[58] Field of Search .................... 417/50, 12; 164/500, 164/147.1, 312, 303, 306, 156, 150, 155; 222/64, 596, 594

[56] References Cited

U.S. PATENT DOCUMENTS

| | | | |
|---|---|---|---|
| 2,219,472 | 10/1940 | Defandorf et al. | 417/12 |
| 3,706,399 | 12/1972 | Sundberg | 417/50 |
| 3,884,291 | 5/1975 | Balevski et al. | 164/312 |
| 3,942,577 | 3/1976 | Uozumi et al. | 417/50 |
| 4,633,930 | 1/1987 | Behrens | 164/312 |
| 4,714,102 | 12/1987 | Koya | 164/500 |

FOREIGN PATENT DOCUMENTS

| | | | |
|---|---|---|---|
| 12971 | 6/1965 | Japan | 164/156 |
| 14338 | 2/1979 | Japan | 164/500 |
| 725175 | 3/1980 | U.S.S.R. | 417/50 |

*Primary Examiner*—Donald E. Stout
*Attorney, Agent, or Firm*—Stevens, Davis, Miller & Mosher

[57] ABSTRACT

When molten metal within a molten metal tank is supplied to an injection sleeve of a casting machine through a molten-metal supply pipe by the operation of an electromagnetic pump, a sensor detects changes in height of the surface of molten metal within the tank as time passes, and a controller corrects the period during which the pump is driven on the basis of molten-metal surface detection signals from the sensor. The controller divides the difference in height of the surface of molten metal within the tank as between its highest level and its lowest level into a number n of regions, and drives the pump in such a controlled manner that the pump is connected to a three phase AC power source and is intermittently supplied with three-phase power having a constant voltage and a constant frequency so that the pump controls the molten-metal supply amount with its driven period serving as a molten-metal supply period. A molten-metal supply period for each supply operation is calculated from a predetermined equation using a molten-metal supply period corresponding to the highest level of the molten metal surface which is in turn determined from the results of casting tests. The degree of precision at which molten metal is supplied is further enhanced by an improved structure of the molten-metal supply pipe.

7 Claims, 5 Drawing Sheets

ELECTROMAGNETIC PUMP TYPE AUTOMATIC MOLTEN-METAL SUPPLY APPARATUS

BACKGROUND OF THE INVENTION

The present invention broadly relates to a casting machine such as a cold chamber type diecasting machine, and more particularly to an electromagnetic pump type automatic molten-metal supply apparatus having a molten-metal supply amount control device adapted to vary the molten-metal supply period so as to compensate for any change in height of the surface of the molten-metal within the molten-metal tank.

In a casting machine such as a cold chamber type diecasting machine, the method of supplying molten metal to the mold that has long been practiced is the one in which the operator handling the casting operation draws up a certain amount of molten metal by a ladle and pours it into the mold. However, this method is disadvantageous in terms of the labour required and the level of precision possible. Therefore, an electromagnetic pump type automatic molten-metal supply apparatus has recently been developed. Such an apparatus has encountered problems concerning what should be done to compensate for changes in static pressure that are caused by change in height of the surface of molten metal within the molten metal tank and for changes in volume of molten metal within the molten-metal supply pipe so that a constant amount of molten metal can be supplied to the mold. In order to maintain the height of the surface of the molten metal within the tank at a constant level, it has been the practice, for instance, to frequently add molten metal by man-powered operations, or to measure the weight of cast products from time to time and manually adjust the timer which sets the molten-metal supply period in such a manner that the weight of cast products will be kept constant. However, such man-powered operations or manual adjustment of the period set in the timer is very cumbersome, and yet is not accurate enough in spite of he fact that a great deal of labour is required. Therefore, it has become essential to enable automatic control. In addition, such a device which performs suitable automatic control should not involve any complicated arrangement for enabling molten metal to be supplied in a constant amount each time nor require any cumbersome operation; instead, it is required to have a simple arrangement and to operate accurately.

An electromagnetic pump type automatic molten-metal supply apparatus is further required to have a structure that meets the following requirements. In an apparatus of this type, molten metal is supplied from the molten metal tank to the cold chamber of an injection cylinder of the diecasting machine through the molten-metal supply pipe by the operation of the pump. Since molten metal at a high temperature is supplied, it is necessary for the molten-metal supply pipe to be made of a material of high quality and with high precision. In addition, the overall structure of the apparatus should be such that the difference in temperature between molten metal in the cold chamber and molten metal in the molten-metal supply pipe causes no damage to the product, and, simultaneously, such that a certain amount of molten metal can be supplied accurately each time.

SUMMARY OF THE PRESENT INVENTION

Accordingly, an object of the present invention is to eliminate the above-mentioned defects of the prior art and provide an electromagnetic pump type automatic molten-metal supply apparatus having a simply-structured molten-metal supply amount control device which is adapted to control the period during which molten metal is supplied from the electromagnetic pump by intermittently supplying drive power to the electromagnetic pump so as to compensate for any change in height of the surface of the molten metal that is caused during supply thereof, thereby enabling the molten metal to be supplied in a constant amount each time.

Another object of the present invention is to provide an electromagnetic pump type automatic molten-metal supply apparatus in which an improved ceramic pipe is used as a molten-metal supply pipe connecting a molten metal tank which stores molten metal and an injection sleeve of a casting machine, thereby further enhancing the degree of accuracy with which the molten metal is supplied and lengthening the life of the apparatus.

In order to achieve the above-stated and other objects, the present invention provides an electromagnetic pump type automatic molten-metal supply apparatus for use in a casting machine comprising an injection sleeve for injecting molten metal into a mold cavity of the casting machine by the operation of an injection plunger, and an electromagnetic pump disposed at a portion of a molten-metal supply pipe connecting a molten metal tank and the injection sleeve for delivering molten metal stored in the molten metal tank to the injection sleeve. The apparatus in accordance with the present invention is characterized in that the injection sleeve has an injection port communicating with the mold cavity and disposed at a position above the highest level of the surface of molten metal stored in the molten metal tank. The apparatus is further characterized by comprising a molten-metal supply amount control device having a sensor for detecting any change in height of the surface of molten metal stored in the molten metal tank as time passes, and a controller electrically connected to the sensor and the electromagnetic pump for correcting and controlling the period during which the electromagnetic pump is driven on the basis of molten-metal-surface detection signals from the sensor.

In order to accomplish the above-mentioned objects with a higher degree of precision, the controller provided for correcting and controlling the period during which the electromagnetic pump is driven is adapted to divide the difference in height of the surface of molten metal within the molten metal tank as between its highest level and its lowest level into a number n (a natural number) of regions; detect the surface of molten metal at each height level by the sensor; drive the electromagnetic pump in such a manner that it is connected to a three-phase alternating current power source and is intermittently supplied with three-phase electric power having a constant voltage and a constant frequency so that the electromagnetic pump controls the molten-metal supply amount with its driven period serving as a molten-metal supply period; determine a molten-metal supply period $T_0$ corresponding to the surface of molten metal within the molten metal tank at its highest level from the results of casting tests; after thus determining the molten-metal supply period $T_0$, calculate a molten-metal supply period $T_i$ on the basis of a signal from the sensor indicative of the molten-metal surface within the ith region by using the following equation:

$$T_i=(1+(i-1)\alpha)\times T_0+(i-1)\beta$$

where $\alpha$ represents a constant indicating the ratio at which the actual pressure-delivery capacity of the electromagnetic pump changes with changes in height of the surface of molten metal within the molten metal tank, $\beta$ represents a correction constant for compensating for changes in volume of a portion of the molten metal which is within the molten-metal supply pipe corresponding to changes in height of the surface of molten metal within the molten metal tank, and i represents the particular 1, 2, 3, . . . or nth region within which the surface of molten metal is located; and drive said electromagnetic pump for the thus calculated period $T_i$.

Further in accordance with the present invention, the molten-metal supply pipe connecting the molten metal tank and the injection cylinder of the casting machine is constituted by a composite pipe comprising an outer tube, a sleeve preformed from ceramic fibers and fitted to the inner peripheral surface of the outer tube, and a ceramic layer formed and deposited on the inner peripheral surface of the sleeve by a Thermit reaction, thereby enabling molten metal to be supplied in a constant amount with a higher degree of precision. This effect is further enhanced by the provision of an improvement in the configuration of a mouthpiece disposed at the junction between the molten-metal supply pipe and the injection sleeve.

DESCRIPTION OF THE PREFERRED EMBODIMENTS

Figure 1:
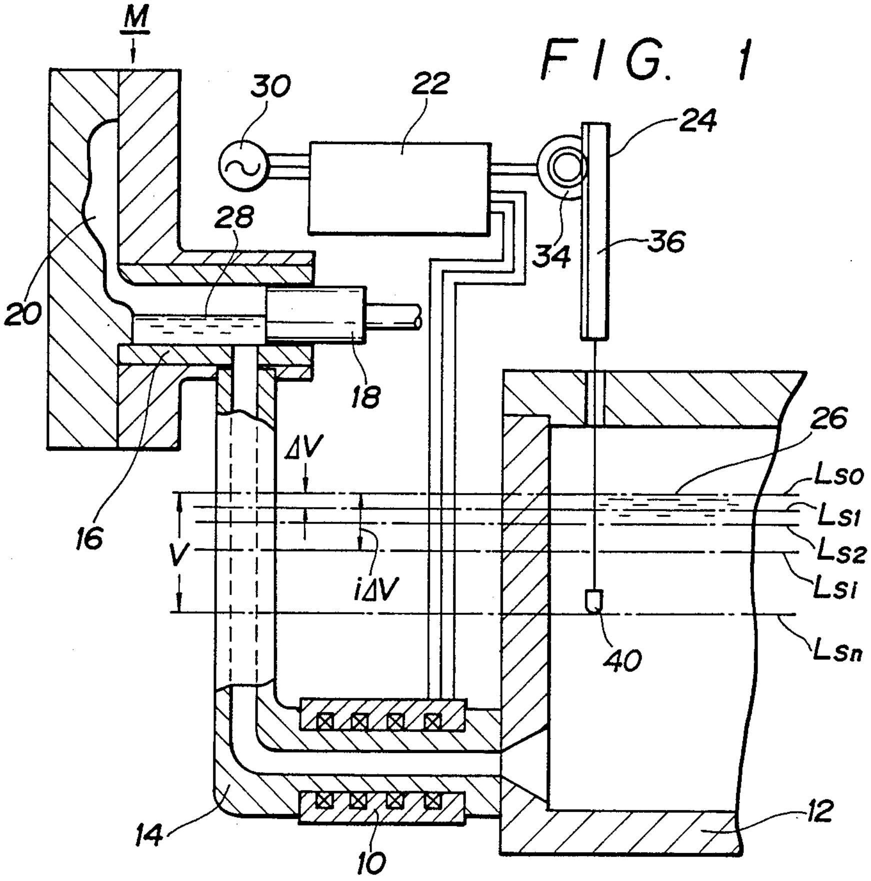
FIG. 1 is a partially cutaway sectional view of an electromagnetic pump type automatic molten-metal supply apparatus having a molten-metal supply amount control device in accordance with the present invention.

FIG. 1 is a partially cutaway sectional view of an electromagnetic pump type automatic molten-metal supply apparatus provided with a molten-metal supply amount control device in accordance with the present invention, showing the structure of the automatic molten-metal supply apparatus and the arrangement of the control device. In FIG. 1, one end of a linear molten-metal supply pipe 14 having a uniform inner diameter is connected to a bottom portion of a molten-metal tank 12. The other end of the molten-metal supply pipe 14 communicates, through a mouthpiece (not shown in FIG. 1, see FIGS. 7 and 6), with the entrance of an injection sleeve 16 which injects molten metal into a mold M of a cold chamber type diecasting machine. An injection port of the injection sleeve 16, which is in communication with a mold cavity 20, is positioned at a level which is above the highest level 26 of the surface of molten metal stored within the molten metal tank 12.

An electromagnetic pump 10 is disposed at the end portion of the molten-metal supply pipe 14 which is closer to the exit of the molten metal tank 12. This electromagnetic pump 10 is driven by a three-phase alternating current (AC) power source via a controller 22 so that it imparts a pumping thrust to molten metal flowing through the molten-metal supply pipe 14 in which the pump 10 is disposed, in accordance with the principle of linear motors.

When the electromagnetic pump 10 is driven in the state shown in FIG. 1, molten metal 28 is supplied into the sleeve 16 through the molten-metal supply pipe 14 by the thrust imparted by the pump 10 and a pressure difference generated by the head of the surface of molten metal within the molten metal tank 12. The pressure-delivered molten metal 28 is injected into the cavity 20 of the mold M by causing an injection plunger 18 to advance, or move to the left as viewed in FIG. 1. As diecasting is repeated in this way, the height of the surface of the molten metal within the molten metal tank 12 gradually changes, that is, it drops to lower levels. To measure these changes, a sensor 24 is provided. The sensor 24 may be of a type in which a float valve or electrodes are employed, or it may be a level meter such as one which measures the level of electric waves or ultrasonic waves. In this embodiment, as shown in FIG. 1, the explanation concerns a case in which the sensor 24 is a type having a probe 40 which can be mechanically moved in the vertical direction.

The controller 22, which is electrically connected to the electromagnetic pump 10, is also electrically connected to the sensor 24 and operates to control the power supplied to the pump 10 on the basis of a surface level signal indicating a change in height of the surface of the molten metal detected by the sensor 24, and increase the period during which the electromagnetic pump 10 is driven, that is, the period during which molten metal is supplied, as the surface of molten metal drops with the increase in number of times molten metal is supplied so as to ensure that a constant amount of molten metal is supplied.

Next, a description will be given concerning the manner of setting the molten-metal supply period to make it possible to supply molten-metal in a constant amount each time, with the molten-metal supply apparatus described above. The surface level of molten metal within the molten metal tank 12 and a portion of the molten metal within the molten-metal supply pipe 14 is changed by each molten-metal supply operation. Assume that the highest level and the lowest level of the surface of molten metal are expressed by $L_{s0}$ and $L_{sn}$, respectively, and that, by equally dividing the difference between these levels by n (a natural number), molten-metal surface levels $L_{s1}$, $L_{s2}$, ... $L_{s(n-1)}$ are set. If a certain internal volume of the molten-metal supply pipe 14 having a height corresponding to the difference in height is equally divided into portions by molten-metal surface levels in the supply pipe 14 which are the same as the molten-metal surface levels $L_{s1}$ to $L_{s(n-1)}$ in the molten metal tank 12, the portions $\Delta V$ of the internal volume of the supply pipe 14 are all equal to each other. In order to supply a constant amount of molten metal when the surface of the molten metal within the tank 12 has dropped to a level $L_{si}$ from its heighest level $L_{s0}$, it is necessary to supply an additional amount of molten metal corresponding to a volume of $\Delta V \times i$. Therefore, if it is assumed that the pressure-delivery capacity of the electromagnetic pump 10 is expressed by a flow rate Q per unit period when the pump is driven by a predetermined magnitude of electric current, it is necessary to correct the molten-metal supply period to be employed during the next molten-metal supply operation by adding thereto a period expressed by:

$$(\Delta V \times i)/Q = \beta \times i \text{ (seconds).}$$

($\beta$ used in this correction of the molten-metal supply period is equal to $\Delta V/Q$.) where $\beta$ represents a correction constant for compensating for any change in volume of molten metal within the molten-metal supply pipe 14 which corresponds to the change in the surface level of molten metal within the molten metal tank 12, and i represents the number of the region within which the molten-metal surface level is located after the 1, 2, 3, ... nth molten-metal supply.

On the other hand, in order to compensate for any change in the surface level of molten metal within the molten metal tank 12, since the pressure-delivery capacity of the electromagnetic pump 10 is maintained at a flow rate Q when the pump 10 is driven by a predetermined magnitude of electric current, it can be seen that a change in pressure corresponding to a change in the head of the surface of molten metal within the tank 12 corresponds to a change in the actual capacity of the pump 10 which pressure-delivers molten metal.

Based on these results, casting tests are conducted when the molten-metal surface level is between, for instance, the levels $L_{s0}$ and $L_{s1}$, by setting the period during which the electromagnetic pump 10 is driven to a value $T_0$; products cast by using this driving period are inspected by repeating the casting tests several times until it is confirmed that the molten-metal supply amount is appropriate; and the value $T_0$ is finally determined.

The level of the surface of the molten metal within the tank 12 is detected by the sensor 24, and a molten-metal supply period $T_i$ is calculated from the following equation, thereby ensuring that molten metal is supplied in a predetermined amount each time:

$$T_i = (1 + (i-1)\alpha) \times T_0 + (i-1)\beta \quad (1)$$

where $\alpha$ represents a constant indicating the ratio at which the actual pressure-delivering capacity of the electromagnetic pump 10 changes in correspondence with changes in the level of surface of molten metal within the molten metal tank 12.

Figure 2:
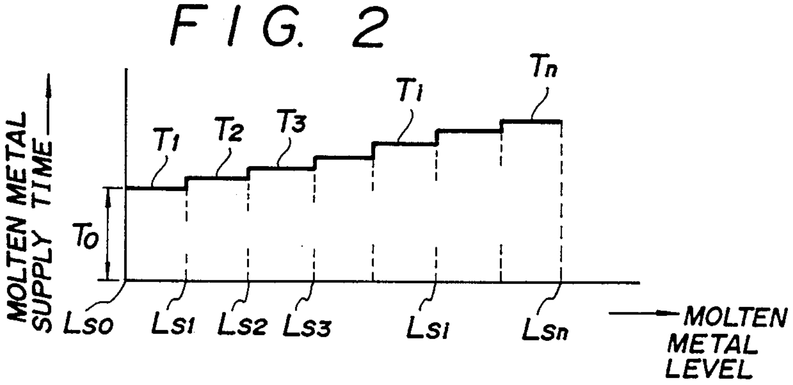
FIG. 2 is a graph showing a characteristic curve of the relationship between a molten-metal supply period $T_i$ and the level of the surface of molten metal within a molten metal tank during the operation of the automatic molten metal supply apparatus shown in FIG. 1.

FIG. 2 is a graph which is useful in explaining the relationship between a molten-metal supply period $T_i$ and the level of the surface of molten metal. As shown in FIG. 2, the molten-metal supply period $T_n$ is increased in a stepped manner as the level of the surface of the molten metal drops.

Figure 3:
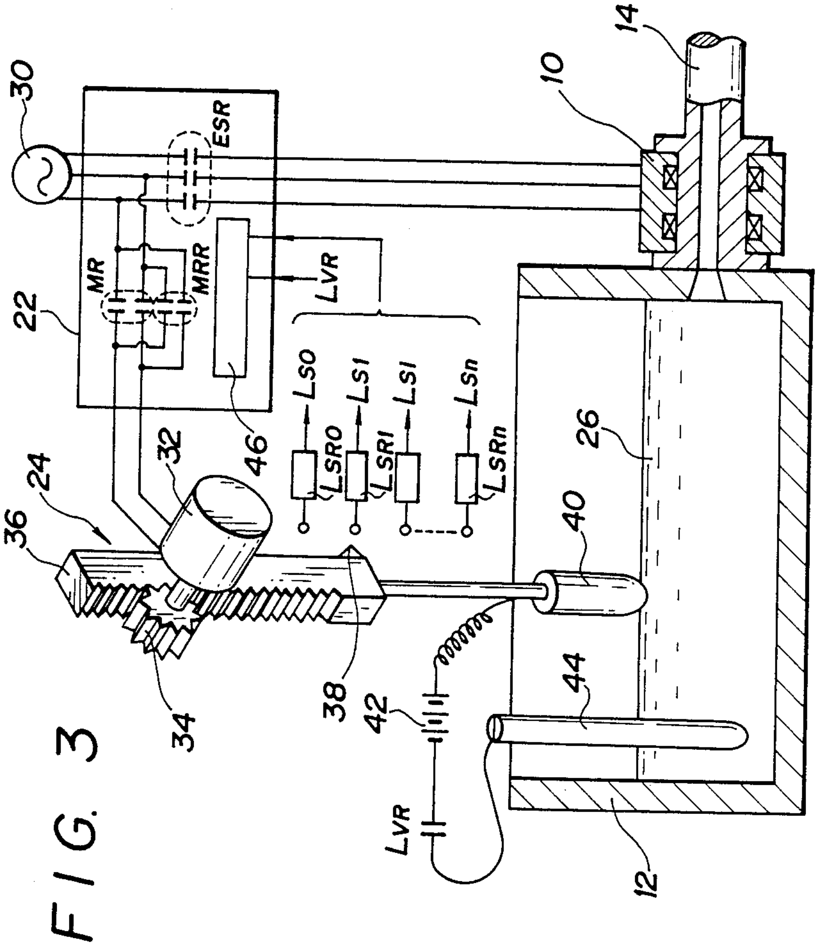
FIG. 3 is an explanatory view illustrating the structure of the automatic molten-metal supply apparatus shown in FIG. 1, particularly, that of a sensor of the apparatus.

FIG. 3 is a view which is used in explaining the arrangement of the sensor 24 and the controller 22. As shown in FIG. 3, the sensor 24 comprises a rack 36 having at one end an electrode 40 of a round-rod shape, a motor 32 for causing vertical movement of the rack 36 through a pinion 34, a dog 38 provided on the rack 36, and limit switches $L_{SR0}$, $L_{SR1}$, ... $L_{SRn}$ which are provided in such a manner as to be actuated by the dog 38 in correspondence with the levels $L_{s0}$, $L_{s1}$, ... $L_{sn}$ of the surface of the molten metal. The dog 38 is adapted to actuate the limit switches only when it is ascending together with the rack 36; it does not actuate the limit switches when it is decending. Another electrode 44, which extends from the opening to the bottom of the molten metal tank 12, is disposed within the tank 12 in such a manner as to be partially immersed in molten metal within the tank 12, and a battery 42 and a relay $L_{VR}$ are provided between the electrodes 44 and 40 to connect them. With this arrangement, when the electrode 40 decends and comes into contact with the molten metal surface at a highest level 26, the relay $L_{VR}$ first inputs an on actuation signal to a logical control circuit 46 of the controller, the electrode 40 then moves upward to come into contact with the limit switch $L_{SR0}$, and an ON-actuation signal of the limit switch $L_{SR0}$ is input to the logical control circuit 46. The controller 22 further includes relays MMR and MR for switching between upward and downward operation of the motor 32, and a current switch ESR, such as a triac, for intermittently driving the electromagnetic pump 10.

Figure 4:
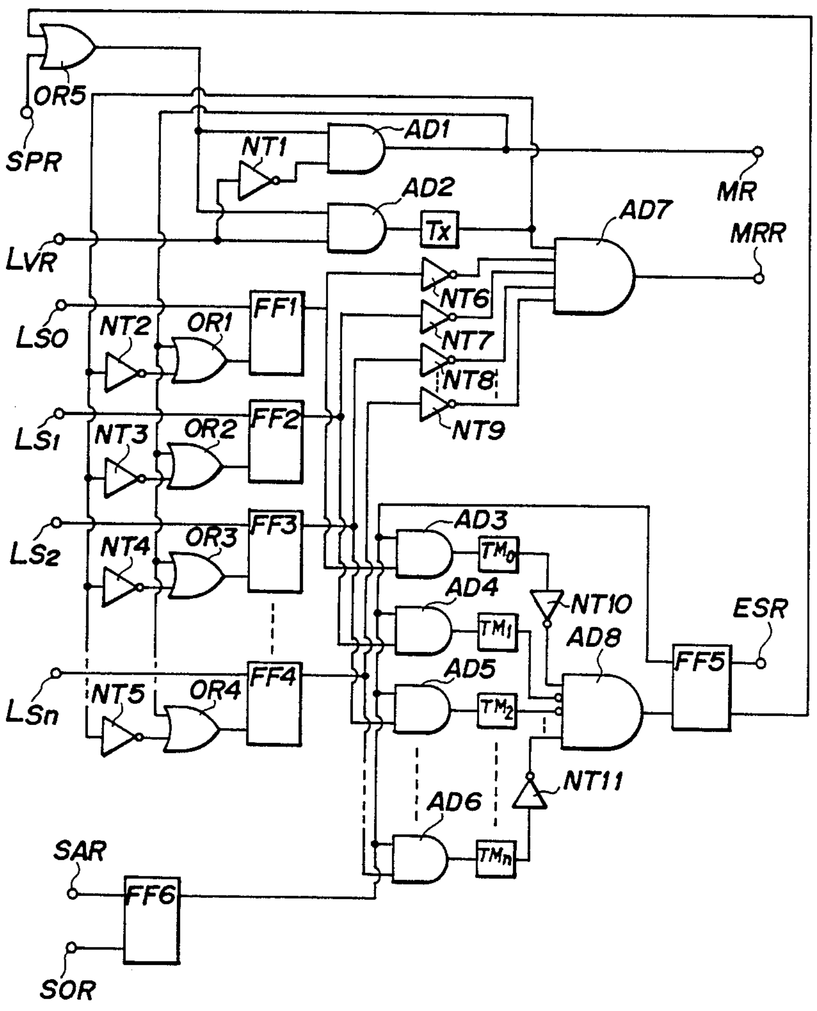
FIG. 4 is a block diagram of a logical control circuit shown in FIG. 3.

FIG. 4 is a circuit diagram of the logical control circuit 46 shown in FIG. 3. In FIG. 4, when a first pushbutton switch for molten-metal supply preparation command SPR is pressed, an ON-actuation signal therefrom is input to an AND gate 1 (hereinafter abbreviated to "AD1") via an OR gate 5 (hereinafter abbreviated to "OR5"), and the output signal from the relay MR is turned on when no ON-actuation signal is input from the relay $L_{VR}$. The motor 32 operates upwardly, and the electrode 40 is brought into contact with the surface of the molten metal within the tank 12. Upon this contact, an ON-actuation signal from the relay $L_{VR}$ is input to the ADl via a NOT gate 1 (hereinafter abbreviated to "NT1") so that the output of the relay MR is turned off, thereby stopping the electrode 40. An AND gate 2 (AD2) starts a timer Tx of an output circuit. The electrode 40 is kept stopped for several seconds, and, when the timer Tx has finished counting, an AND gate 7 (AD7) turns on the output of the relay MRR, thereby starting the upward operation of the motor 32. When the limit switch $L_{SR0}$ is actuated, an actuation signal $L_{S0}$ therefrom is turned on, and the output of a flip-flop 1 (hereinafter abbreviated to "FF1") turns off the output of the relay MMR via the AND gate 7 (AD7). Then, when a second pushbutton switch for a molten-metal supply command SAR is pressed, the output signal to the current switch ESR from a flip-flop 5 (FF5), which is connected to the second pushbutton switch via a flip-flop 6 (FF6), is turned on, thereby driving the electromagnetic pump 10 and, simultaneously, starting a timer $TM_0$ (in which a time period $T_0$ is set) at the output of an AND gate 3 (AD3). When the timer $TM_0$ has finished counting the predetermined period $T_0$, the output of an AND gate 8 (AD8) is turned off, and the output signal from the FF5 to the current switch ESR is turned off, thereby stopping the electromagnetic pump 10. Simultaneously, another output of the FF5 is turned on, and is again input to the AD1, thereby turning on the output signal therefrom to the relay MR, and starting the downward movement of the electrode 40. In this way, each time a signal $L_{s1}$, $L_{s2}$, . . . $L_{si}$, . . . $L_{sn}$ indicating the surface of molten metal detected by the sensor 24 is input, the electromagnetic pump 10 is driven so that a molten-metal supply is effected for a preset operation period set by a timer $TM_0$ $TM_1$, $TM_2$, . . . $TM_n$, that is, for a molten-metal supply period $T_1$, $T_2$, $T_3$, . . . $T_n$. Finally, when a third pushbutton switch for molten-metal supply inhibition command SOR is pressed, the molten-metal supplying operation is completed. The above-described operation can be performed in a very similar manner by using a computer. When a computer is used, the periods $TM_0$, $TM_1$, . . . $TM_n$ can be automatically set by calculating the values of $T_i$ from the above-stated equation (1).

In normal diecasting, one casting cycle takes about 30 seconds, and the interval at which hot charging operations are performed is 30 to 60 minutes. This means that, in this example, 60 to 120 cast products are made per hot charging operation. Therefore, when the present invention is put into practice, setting the number n of detection times to a number between 60 to 120 is complicated. In practice, it is not necessary to set the number of detection times to such a large number, and, normally, it is sufficient to make n about 10. In this case, if the degree of precision with which the control is effected is not high enough, control may be effected in the following manner. In each of a predetermined number of detection regions, the molten-metal surface detection electrode is returned to a position at a predetermined level after each detection of the surface level, and, in the next detection, the electrode is moved downward until it comes into contact with the actual level of the molten-metal surface to detect the surface. The molten-metal supply period is corrected in accordance with the actual level of the molten-metal surface by, for instance, detecting the period from the time the electrode starts to descend from the predetermined level to the time the electrode detects the molten-metal surface.

The above-mentioned molten-metal supply pipe 14 is normally constituted by a composite pipe, i.e., a so-called ceramic pipe. Such a composite pipe is produced by causing a mixture of powder of ferric oxide ($Fe_2O_3$) and powder of aluminum (Al) to spin at a high speed around the inner peripheral surface of an outer tube such as a high-pressure type steel tube or a stainless steel tube, igniting the mixture so as to cause a Thermit reaction and form a deposited layer of ceramics. However, when molten Al alloy at high temperature, which is very often used as the molten metal, flows through a pipe produced in this way, since the expansion coefficient of the outer tube and that of the deposited ceramic layer are different, there is a risk that fine cracks may be formed in the deposited ceramic layer, which may sometimes lead to the problem that molten Al alloy comes into contact with the outer tube, thus corroding the outer tube.

Figure 5:
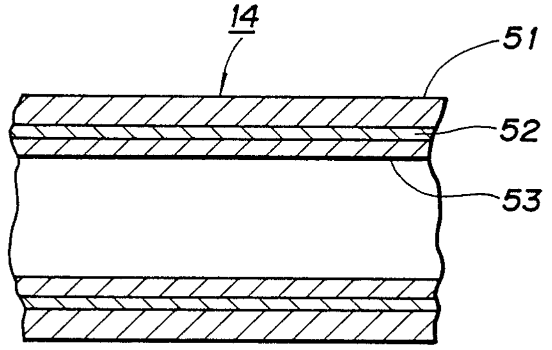
FIG. 5 is a fragmentary sectional view through a molten-metal supply pipe connecting a casting machine and the molten metal tank of the electromagnetic pump type automatic molten-metal supply apparatus in accordance with the present invention.

Accordingly, the electromagnetic pump type automatic molten-metal supply apparatus in accordance with the present invention has a molten-metal supply pipe which is cpable of eliminating the above-described defect even when, for example, molten Al alloy is used as the molten metal. That is, as shown in FIG. 5, the molten-metal supply pipe 14 is constituted by a ceramic pipe formed by fitting on the inner peripheral surface of an outer tube 51 a sleeve 52 preformed from ceramics fibers, placing on the inner surface of the sleeve a powder of $Fe_2O_3$ and a powder of Al (not shown), rotating the outer tube 51 at a high speed, and igniting the powders to cause a Thermit reaction and thereby deposit a ceramic layer 53.

By virtue of this arrangement, since a sleeve 52 preformed from ceramic fibers is interposed between the outer tube 51 and the deposited ceramic layer 53, the sleeve preformed from ceramic fibers acts as a buffer which mitigates the difference between the expansion coefficients, thus eliminating the formation of any cracks in the deposited ceramic layer even when molten Al alloy flows through the supply pipe. As a result, the outer tube 51 is kept from coming into contact with molten Al alloy and from being corroded thereby. In this way, the molten-metal supply pipe can enjoy a longer life, and it becomes possible to consistently supply a constant amount of molten metal accurately to the injection sleeve 16, thus enhancing the performance of the electromagnetic pump type automatic molten-metal supply apparatus.

Figure 6:
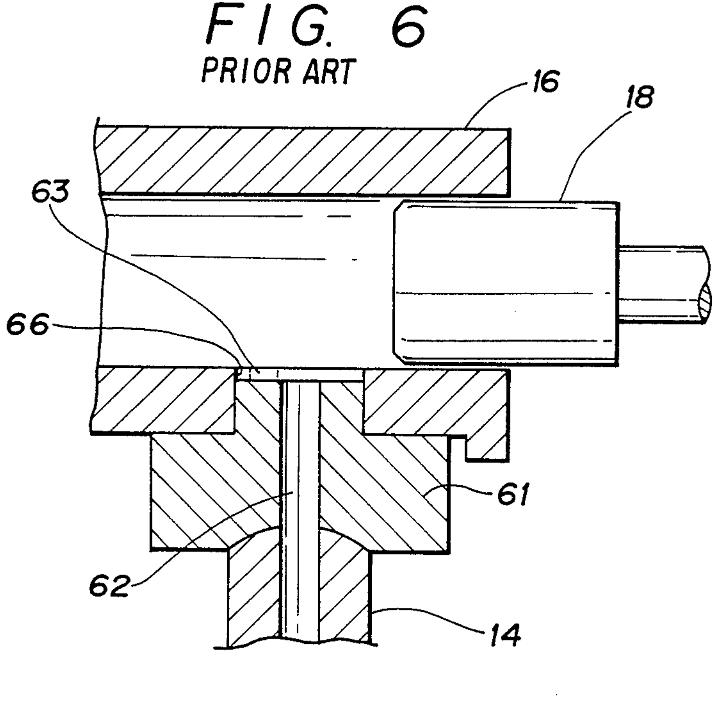
FIG. 6 PRIOR ART
FIG. 6 is a sectional view of the prior art through the junction between a molten-metal supply pipe and an injection sleeve of a casting machine.

At the junction between the molten-metal supply pipe 14 and the injection sleeve 16 in the prior art, the arrangement is the one shown in FIG. 6. That is, a molten-metal inlet port 66 of the injection sleeve 16 and the end of the molten-metal supply pipe 14 at which it is connected to the injection sleeve 16 are actually connected through a mouthpiece 61. This mouthpiece 61 has at the center a flow passage 62 through which molten metal flows and which is formed in alignment with the flow passage through the molten-metal supply pipe 14. A gap 63 is provided between the upper end of the mouthpiece 61 and the injection sleeve 16 so that the mouthpiece 61 is connected to the sleeve at a position slightly below the lower surface of the injection sleeve 16 while being kept from coming into contact with the sliding plunger 18.

When a cold chamber type diecasting machine is used as the casting machine, the injection sleeve 16 and the plunger 18 are normally formed of heat resistant steel, and are cooled so as not to be affected by heat. On the other hand, the molten-metal supply pipe 14 and the mouthpiece 61 are made of ceramics and are heated so as to prevent solidification of molten metal.

A diecasting operation employing the mouthpiece 61 structured as described above, however, encounters the following problems. When the plunger 18 is retracted after it has advanced (i.e., moved to the left as viewed in FIG. 6) so as to inject molten metal within the sleeve 16, a certain amount of molten metal remains within the gap 63. Since the layer of molten metal within the gap 63 is thin and the injection sleeve 16 is cooled, the molten metal forms a solidified skin in a relatively short period. When the plunger 18 advances in the next injection, it comes into contact with this solidified skin. This causes wear of the plunger 18 and shortens its life. Even if the gap 63 is made wider, this causes an increase in the area of molten metal along which it comes into contact with the cooled injection sleeve 16. Thus, the above-stated problem cannot be solved simply by widening the gap 63.

Figure 7:
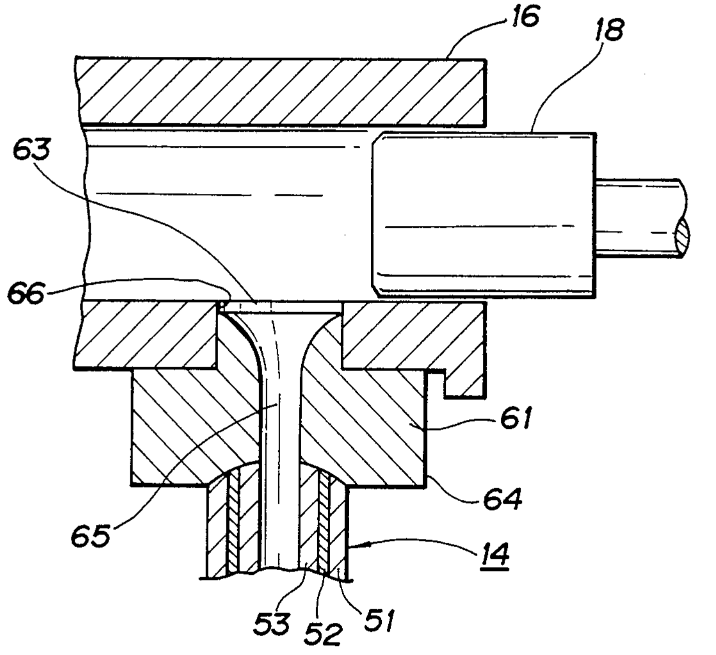
FIG. 7 is a view corresponding to FIG. 6 and showing a section through the junction between the molten-metal supply pipe of the apparatus in accordance with the present invention and an injection sleeve of a casting machine.

In view of the above-described circumstances, the present invention provides a different type of mouthpiece 64 such that, as shown in FIG. 7, a flow passage 65 through which molten metal flows is formed in the shape of a cone in which the inner diameter increases toward the injection sleeve 16 and the opening edge is in contact with the wall forming an opening in the sleeve 16. By virtue of this arrangement, when the plunger 18 is advancing to inject molten metal, since the supply of molten metal through the supply pipe 14 has by this time stopped, after the passage of the opening edge of the mouthpiece 64 by the plunger 18, atmospheric pressure prevails within the injection sleeve 16 and causes molten metal filling the opening portion of the mouthpiece 64 to flow backward and descend. At this time, since the opening portion of the mouthpiece 64 has an inner surface configuration which is cone-shaped with the inner diameter increasing toward the injection sleeve 16, the molten metal descends without remaining in the gap 66, thus preventing any molten metal from becoming attached to the inner wall that forms the opening portion of the mouthpiece 64 and from remaining therein. This can eliminate the formation of any solidified skin and, hence, any wear of the plunger, thereby not only lengthening the life of the plunger but also enhancing the degree of precision obtainable and lengthening the life of the electromagnetic pump type automatic supply apparatus as a whole.

As will be clearly understood from the foregoing embodiment and modifications, it is possible, according to the present invention to consistently supply a constant amount of molten metal even with change in the level of the surface of molten metal within the molten metal tank, thereby enabling completely automatic control In addition, the electromagnetic pump is driven by power having a constant voltage and a constant frequency, the operation of intermittently driving the pump for adjusting the molten-metal supply period is adequately performed by a simple current switch, such as a triac, connected in series to the load, and control of the molten-metal supply amount does not necessitate any voltage adjustment with phase control and enables manufacture of the system at low cost.

In addition, by virtue of the provision of a sleeve preformed from ceramic fibers which is interposed between the outer tube and an inner ceramic layer, it is made possible to positively and consistently effect supply of molten metal and molten metal at high temperature in constant amounts. Further, by adopting an improved design for the opening at the junction between the molten-metal supply pipe and the injection sleeve, it becomes possible to further enhance the above-described effects.

While a preferred embodiment of the present invention has been described, it is to be understood that changes and variations may be made without departing from the spirit of the invention.

What is claimed is:

1. A casting machine comprising:

a mold cavity, an injection plunger, an injection sleeve for injecting molten metal into said mold cavity by movement of said injection plunger, a molten metal supply tank, a molten-metal supply pipe connecting said molten metal supply tank and said injection sleeve, said injection sleeve having an injection port communicating with said mold cavity and disposed at a position above a highest level of a surface of molten metal stored in said molten metal supply tank, an electromagnetic pump disposed at a portion of said molten metal supply pipe for delivering molten metal stored in said molten metal supply tank to said injection sleeve; and, a molten metal supply amount control device comprising:

a first means for providing a control signal which varies in accordance with changes in height of said surface of molten metal with elapsed time; and a second means connected to said first means and said electromagnetic pump for correcting and controlling a time period during which said electromagnetic pump is driven on the basis of said control signal from said first means.

2. A casting machine according to claim 1, wherein said second means for correcting and controlling the period during which said electromagnetic pump is driven comprises:

means for dividing the difference in height of the surface of molten metal within said molten metal tank as between its highest level and its lowest level into a number n (a natural number) of regions;

means responsive to said first means for detecting the surface of molten metal at each height level;

means for driving said electromagnetic pump in such a manner that it is connected to a three-phase alternating current power source and is intermittently supplied with three-phase frequency so that said electromagnetic pump controls the molten-metal supply amount with its driven period serving as a molten metal supply period;

means for determining a molten-metal supply period $T_O$ corresponding to the surface of molten metal within said molten metal tank at its highest level from the results of casting tests;

means operative after determining the molten-metal supply period $T_O$ for calculating a molten-metal supply period $T_i$ on the basis of a signal indicative of the molten-metal surface within the ith region by using the following equation:

$$T_i=(1+(i-1)\alpha)\times T_O+(i-1)\beta$$

where $\alpha$ represents a constant indicating the ratio at which the actual pressure-delivery capacity of said electromagnetic pump changes with changes in height of the surface of molten metal within said molten metal tank, $\beta$ represents a correction constant for compensating for changes in volume of a portion of the molten metal within said molten-metal supply pipe corresponding to changes in height of the surface of molten metal within said molten metal tank, and i represents the particular 1, 2, 3, . . . or nth region within which the surface of molten metal is located; and means for driving said electromagnetic pump for the thus calculated period $T_i$.

3. A casting machine according to claim 1, wherein said molten-metal supply pipe and a molten-metal inlet opening of said injection sleeve are connected to each other through a mouthpiece, the inner surface of said mouthpiece being formed in the shape of a cone in which the inner diameter increases toward said molten-metal inlet opening of said injection sleeve

4. A coating machine according to claim 1, wherein said molten-metal supply pipe comprises an outer tube, a sleeve preformed from ceramic fibers and slidingly fitted to the inner peripheral surface of said outer tube in close contact therewith, and a ceramic layer formed and deposited on the inner peripheral surface of said sleeve.

5. A coating machine according to claim 4, wherein said ceramic layer is formed and deposited by placing a powder of ferric oxide ($Fe_2O_3$) and a powder of aluminum within said sleeve, rotating said outer tube at a high speed, and igniting said powders so as to cause a Thermit reaction.

6. A casting machine according to claim 3, wherein said molten-metal supply pipe comprises an outer tube, a sleeve preformed from ceramic fibers and slidingly fitted to the inner peripheral surface of said outer tube in close contact therewith, and a ceramic layer formed and deposited on the inner peripheral surface of said sleeve.

7. A casting machine according to claim 6, wherein said ceramic layer is formed and deposited by placing a powder of ferric oxide ($Fe_2O_3$) and a powder of aluminum within said sleeve, rotating said outer tube at a high speed, and igniting said powders so as to cause a Thermit reaction.

* * * * *